(12) United States Patent
Jiang et al.

(10) Patent No.: US 10,838,522 B2
(45) Date of Patent: Nov. 17, 2020

(54) METHOD FOR SIGNAL TRANSMISSION, METHOD FOR SIGNAL RECEPTION AND APPARATUSES

(71) Applicant: SHENZHEN GOODIX TECHNOLOGY CO., LTD., Shenzhen (CN)

(72) Inventors: Hong Jiang, Shenzhen (CN); Guanjun Zhang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/569,622

(22) Filed: Sep. 12, 2019

(65) Prior Publication Data

US 2020/0050297 A1 Feb. 13, 2020

Related U.S. Application Data

(63) Continuation of application No. PCT/CN2018/100178, filed on Aug. 13, 2018.

(51) Int. Cl.
  *G06F 3/0354* (2013.01)
  *G06F 3/041* (2006.01)
  *G06F 3/044* (2006.01)

(52) U.S. Cl.
  CPC ........ *G06F 3/03545* (2013.01); *G06F 3/0442* (2019.05); *G06F 3/04162* (2019.05)

(58) Field of Classification Search
  CPC .. G06F 3/03545; G06F 3/0442; G06F 3/0446; G06F 3/04162
  See application file for complete search history.

(56) References Cited

U.S. PATENT DOCUMENTS

| | | | |
|---|---|---|---|
| 2012/0327041 A1* | 12/2012 | Harley | G06F 3/044 345/179 |
| 2013/0207938 A1 | 8/2013 | Ryshtun et al. | |
| 2014/0028577 A1 | 1/2014 | Krah et al. | |
| 2016/0252981 A1* | 9/2016 | Chang | G06F 3/0414 345/179 |
| 2017/0060276 A1 | 3/2017 | Qiao et al. | |

(Continued)

FOREIGN PATENT DOCUMENTS

| | | |
|---|---|---|
| CN | 105511693 A | 4/2016 |
| WO | 2017/044975 A1 | 3/2017 |

OTHER PUBLICATIONS

The Chinese International Search Report of corresponding international application No. PCT/CN2018/100178, dated Mar. 27, 2019.

(Continued)

*Primary Examiner* — Ricardo Osorio
(74) *Attorney, Agent, or Firm* — J.C. Patents

(57) ABSTRACT

The present application provides a method and apparatus for signal transmission, and a method and apparatus for signal reception, where the method for signal transmission is applied to an active stylus, including: phase encoding information to be transmitted using a preset phase signal, to obtain an encoded signal; and transmitting a stylus tip signal, where the stylus tip signal comprises the encoded signal. The present application can increase amount of information transmitted between the active stylus and a touch control screen in a limited duration.

17 Claims, 13 Drawing Sheets

(56) References Cited

U.S. PATENT DOCUMENTS

| | | | | |
|---|---|---|---|---|
| 2017/0123519 A1* | 5/2017 | Reitan | .................... | G06F 3/0416 |
| 2017/0131798 A1* | 5/2017 | Geaghan | ................. | G06F 3/044 |
| 2017/0153763 A1* | 6/2017 | Vavra | ..................... | G06F 3/0488 |
| 2017/0344174 A1* | 11/2017 | Pant | ..................... | G06F 3/03545 |
| 2018/0143703 A1* | 5/2018 | Fleck | ...................... | G06F 3/044 |
| 2018/0246587 A1* | 8/2018 | Dekel | ................. | G06F 3/03545 |
| 2018/0284946 A1* | 10/2018 | Yousefpor | ............ | G06F 3/03545 |
| 2018/0343079 A1* | 11/2018 | Imanilov | ............. | H04L 63/0428 |

OTHER PUBLICATIONS

The extended European Search Report of corresponding European application No. 18907472.7-1216, dated Mar. 12, 2020.

* cited by examiner

First phase signal     Second phase signal

METHOD FOR SIGNAL TRANSMISSION, METHOD FOR SIGNAL RECEPTION AND APPARATUSES

CROSS-REFERENCE TO RELATED APPLICATION

This application is a continuation of International Application No. PCT/CN2018/100178, filed on Aug. 13, 2018, which is hereby incorporated by reference in its entirety.

TECHNICAL FIELD

Embodiments of the present disclosure relate to touch technology, and in particular, to a method for signal transmission, a method for signal reception, and apparatuses.

BACKGROUND

With the development of touch technology, more and more electronic devices can realize human-computer interaction through touch technology.

Generally, touch control of a touch control screen of an electronic device may be performed via a finger, and it may also be performed via a touch control pen. A stylus includes an active touch control pen and a passive touch control pen. The active touch control pen is also referred to as an active stylus, which is more and more widely used and the trend of which is a faster refresh rate and more information transmission. The active stylus may implement an information transmission between the active stylus and the touch control screen by transmitting a stylus tip signal to the touch control screen. Currently, there is a certain time interval between each code in the stylus tip signal. Therefore, as driving time is limited, the information that the active stylus can transmit to the touch control screen is limited.

SUMMARY

Embodiments of the present disclosure provide a method and apparatus for signal transmission, and a method and apparatus for signal reception, to increase amount of information transmitted between an active stylus and a touch control screen in a limited duration.

The embodiments of the present application provide a method for signal transmission, which applied to an active stylus, where the method includes:

phase encoding information to be transmitted using a preset phase signal, to obtain an encoded signal; where the encoding may be binary encoding or multi-ary encoding; using fewer encoding digits to transmit more information can be achieved by using phases to perform multi-ary encoding; for example, if 0°, 90°, 180°, and 270° are used to perform quaternary encoding, 4096 levels of pressure encoding may be transmitted using 6 digits; similarly, using fewer digits to transmit more information can be achieved by using more phases to perform bigger-number-ary encoding;

transmitting a stylus tip signal, where the stylus tip signal includes the encoded signal.

The embodiments of the present application may further provide a method for signal reception, which applied to an electronic device having a touch control screen, where the method includes:

acquiring a stylus tip signal transmitted by an active stylus, where the stylus tip signal includes: an encoded signal; and phase decoding the encoded signal according to a preset phase signal, to obtain transmitted information.

The embodiments of present application may further provide an apparatus for signal transmission, where the apparatus includes:

an encoding module, configured to phase encode information to be transmitted using a preset phase signal, to obtain an encoded signal; and a transmitting module, configured to transmit a stylus tip signal, where the stylus tip signal includes the encoded signal.

The embodiments of present application may further provide an apparatus for signal reception, where the apparatus includes:

an acquiring module, configured to acquire a stylus tip signal transmitted by an active stylus, where the stylus tip signal includes: an encoded signal; and a decoding module, configured to phase decode the encoded signal according to a preset phase signal, to obtain transmitted information.

In the method and apparatus for signal transmission, and the method and apparatus for signal reception according to the embodiments of the present application, the information to be transmitted may be phase encoded using the preset phase signal to obtain the encoded signal, and the stylus tip signal including the encoded signal is transmitted. In the methods, since the encoded signal in the stylus tip signal is encoded according to the phase signal, there is no need to set a time interval between different information in the encoded signal, therefore, time occupied by an ineffective signal in the stylus tip signal may be reduced, so that the active stylus can continuously transmits information in the driving time, which enables the active stylus to transmits more information in the effective driving time. In addition, using fewer digits to transmit more information can be achieved by using more phase signals to perform bigger-number-ary coding.

BRIEF DESCRIPTION OF THE DRAWINGS

In order to more clearly illustrate technical solutions in embodiments of the present application or the prior art, accompanying drawings required for describing the embodiments or the prior art will be briefly described below. Obviously, the accompanying drawings in the following description are some of the embodiments of the present application, and other drawings can be obtained by those skilled in the art based on these accompanying drawings without any creative effort.

FIG. 1A is a schematic structural diagram 1 of a capacitive touch system to which an embodiment of the present application is applied to;

FIG. 1B is a schematic structural diagram 2 of a capacitive touch system to which an embodiment of the present application is applied to;

FIG. 1C is a schematic structural diagram of an AFE circuit of a capacitive touch system to which an embodiment of the present application is applied to;

DETAILED DESCRIPTION OF THE EMBODIMENTS

Technical solutions in embodiments of the present disclosure will be clearly and completely described below in conjunction with the accompanying drawings in the embodiments of the present disclosure, in order to make the objects, technical solutions and advantages of the embodiments of the present disclosure clearer. Apparently, the described embodiments are a part of, instead of all of the embodiments of the present disclosure. All other embodiments obtained by those skilled in the art based on the embodiments of the present disclosure without creative labor will fall within the scope of the present disclosure.

All technical and scientific terms used herein have the same meaning as commonly understood by a person skilled in the art to which this disclosure applies, unless otherwise defined. The terms used herein are merely for the purpose of describing particular embodiments, and are not intended to limit the present application. The term "and/or" as used herein includes any or all combinations of one or more of associated listed items. Some embodiments of the present application are described in detail below with reference to the accompanying drawings. Features of the embodiments and examples described below can be combined with each other without conflict.

The method and apparatus for signal transmission, and the method and apparatus for signal reception according to the following embodiments may be applied to various fields of capacitance detection where a finger and an active stylus are required, for example, any electronic device with a touch control function, such as a smart phone with an active stylus and a touch control function, a laptop, a wearable device, a home appliance, a tablet and the like. There electronic devices may have a capacitive touch control screen for implementing a touch control function based on capacitance detection technology.

Figure 1A:
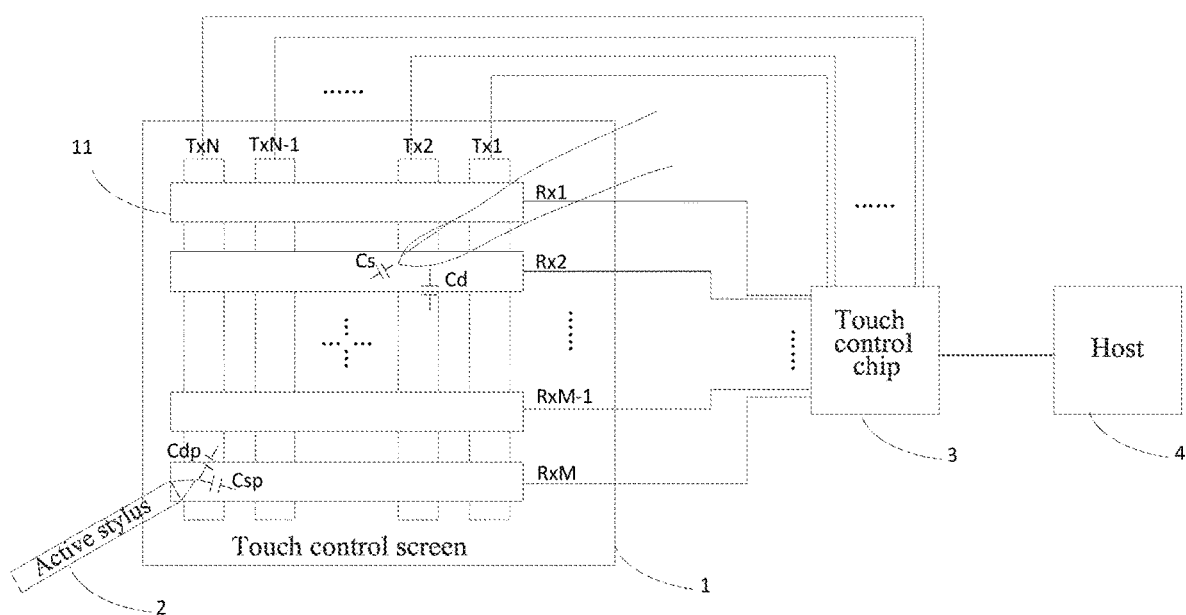
Figure 1B:
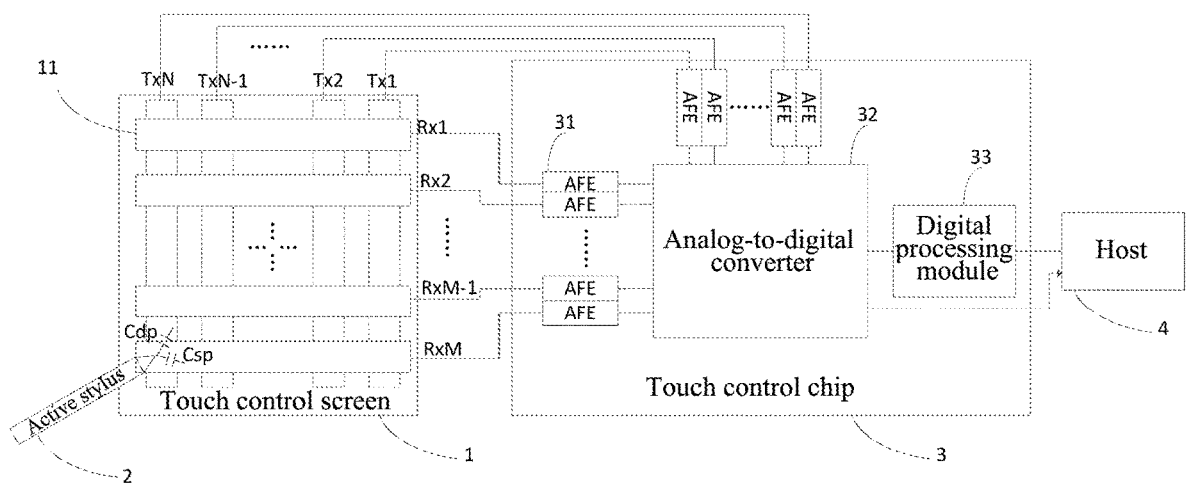

A capacitive touch system to which the solutions of the embodiments of the present application are applied is illustrated by way of example. FIG. 1A is a schematic structural diagram 1 of a capacitive touch system to which an embodiment of the present application is applied. As illustrated in FIG. 1A, the capacitive touch system may include: a touch control screen 1, an active stylus 2, a touch control chip 3 and a host 4. The touch control screen 1 may include: a plurality of touch control sensors 11. The plurality of touch control sensors 11 include N transmitting sensors, M receiving sensors. The N transmitting sensors and the M receiving sensors are arranged in a form of a matrix. The N transmitting sensors may be Tx1, Tx2, . . . , TxN as illustrated in FIG. 1A and FIG. 1B. The M receiving sensors may be Rx1, Rx2, . . . , RxM as illustrated in FIG. 1A and FIG. 1B.

Each of the plurality of touch control sensors 11 is connected with the touch control chip 3. The touch control chip 3 is connected with the host 4. The host 4 may be, for example, a central processing unit (CPU, for short) of the electronic device.

The capacitive touch system illustrated in FIG. 1 may support touch control by both a finger and an active stylus. When the touch control is performed by the finger, the touch control chip 3 may identify a position of the finger on the touch control screen 1 by detecting self-capacitance and mutual capacitance between the finger and a touch sensor 11 at a corresponding position.

When the touch control is performed by the active stylus, coupling capacitance is formed between a stylus tip of the active stylus 2 and the touch control sensors 11 at a corresponding position. The active stylus 2 generates a driving signal according to information to be transmitted, and transmits the driving signal, also referred to as a stylus tip signal, to the touch control chip 3 through the coupling capacitance between the stylus tip of the active stylus 2 and the touch control sensors 11.

In an example, the touch control chip 3 may obtain transmitted information of the active stylus 2 by identifying the received driving signal and demodulating the driving signal. In another example, the touch control chip 3 may transmit the driving signal to the host 4, and the driving signal is demodulated by the host 4 to obtain the transmitted information of the active stylus 2. In yet another example, the driving signal may be demodulated by a combination of the touch control chip 3 and the host 4 to obtain the transmitted information of the active stylus 2. For example, the touch control chip 3 may determine part of information of the active stylus 2, and the host 4 determines other information of the active stylus 2.

FIG. 1B is a schematic structural diagram 2 of a capacitive touch system to which an embodiment of the present application is applied. As illustrated in FIG. 1B, based on the FIG. 1A as described above, in the capacitive touch system, the touch control chip 3 may include: a plurality of analog front-end (AFE, for short) circuits 31, an analog-to-digital converter (ADC, for short) 32 and a digital processing module 33. Each AFE circuit 31 may be connected to one touch control sensor 11. The stylus tip signal of the active stylus 2 may be, through the coupling capacitance between the stylus tip and a corresponding touch control sensor 11, coupled to the AFE circuit 31 connected to the touch control sensor 11, and the stylus tip signal is amplified and/or filtered by the AFE circuit 31. Each AFE circuit 31 is also connected to the ADC 32 to transmit the stylus tip signal processed by the each AFE circuit 31 to the ADC 32, that is, to enable the stylus tip signal processed by the each AFE circuit 31 to be collected by the ADC 32.

After converting the collected signal to a digital signal, the ADC 32 transmits the digital signal to the digital processing module 33, so that the digital processing module 33 determines the transmitted information of the active stylus 2 according to the converted digital signal, and transmits the result to the host 4.

Alternatively, the touch control chip 3 may not include the digital processing module 33. After converting the collected signal to a digital signal, the ADC 32 transmits the digital signal to the host 4, and the host 4 determines the transmitted information of the active stylus 2 according to the converted digital signal.

Figure 1C:
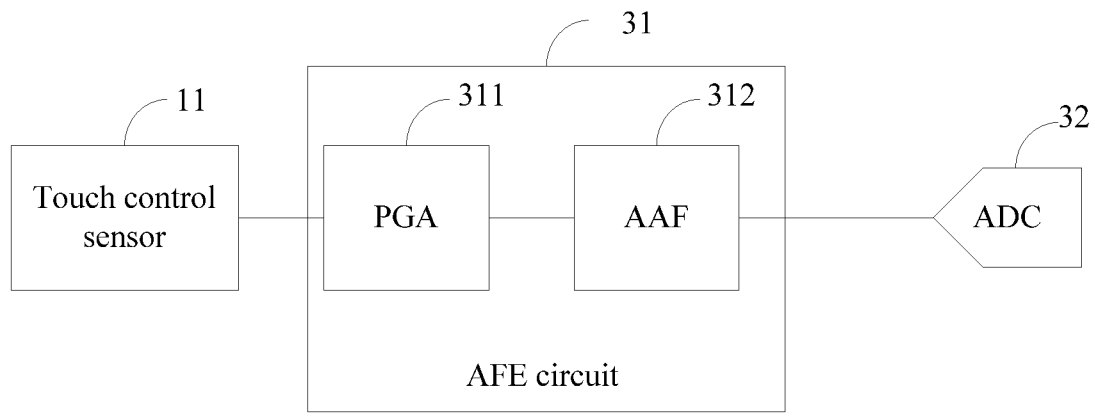

FIG. 1C is a schematic structural diagram of an AFE circuit of a capacitive touch system to which an embodiment of the present application is applied to. As illustrated by FIG. 1C, each AFE circuit 31 illustrated in FIG. 1B described above may include: a programmable gain amplifier (PGA, for short) 311, and an analog antialiasing filter (AAF, for short) 312. An input end of the PGA 311 is connected to one touch control sensor 11. The touch control sensor 11 may be a transmitting sensor or a receiving sensor. An output end of the PGA 311 is connected to the AAF 312. The AAF 312 is connected to the ADC 32.

The PGA 311 may amplify the stylus tip signal of the active stylus 2 coupled thereto, for example, adjust an amplitude of the stylus tip signal to a preset amplitude to achieve amplification of the amplitude. The AAF 312 may filter out interference except a preset driving frequency in the signal processed by the PGA 311, and then transmits the filtered signal to the ADC 32, so that the signal collected by the ADC 32 is an effective signal in the stylus tip signal.

In the following, a method for signal transmission, a method for signal reception, an active stylus, an electronic device and a storage medium applied in any one of the touch control systems according to FIG. 1A to FIG. 1C are illustrated by means of multiple instances.

Figure 2:
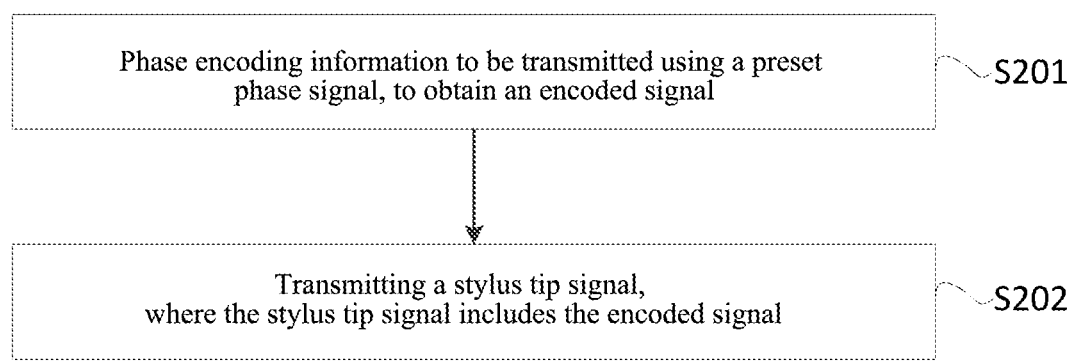
FIG. 2 is a flowchart of a method for signal transmission according to an embodiment of the present application.

FIG. 2 is a flowchart of a method for signal transmission according to an embodiment of the present application. The method for signal transmission may be performed by the active stylus 2 according to any touch control system described above. As illustrated in FIG. 2, the method for signal transmission may include:

S201: phase encoding information to be transmitted using a preset phase signal, to obtain an encoded signal.

The active stylus 2 may acquire the information to be transmitted in a situation where the active stylus 2 is in contact with the touch control screen 1, and then perform S201. The information to be transmitted may be a digital signal.

The preset phase signal may be, for example, any type of analog phase signal such as a sine wave signal, a cosine wave signal, or a triangular wave signal.

When the information to be transmitted is phase encoded using the preset phase signal, the obtained encoded signal may be an analog signal.

For the information to be transmitted, the phase encoding for different multi-ary codes may be performed using different phase signals. The different phase signals may be, for example, multiple signals with different initial phases.

If the information to be transmitted is an N-ary code, N-ary numbers "0", "1", "N−1" may be phase encoded respectively using sine wave signals with an initial phase difference of 360/N.

For example, if the information to be transmitted is a binary code, binary numbers "0", and "1" may be phase encoded respectively using sine wave signals with an initial phase difference of 180°.

If the information to be transmitted is a quaternary code, quaternary numbers "0", "1", "2" and "3" are phase encoded respectively using sine wave signals with initial phase differences of 0°, 90°, 180°, and 270°.

Similarly, using fewer digits to transmit more information can be achieved by using more phase signals to perform bigger-number-ary coding.

Figure 3:
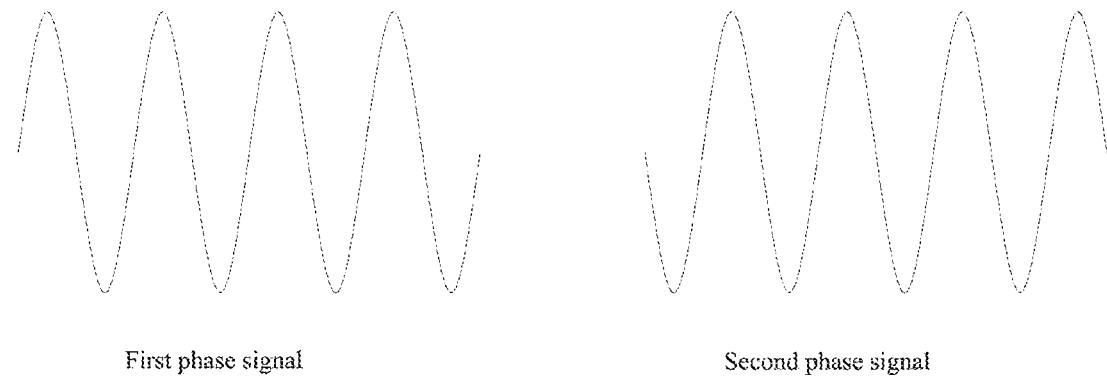
FIG. 3 is a schematic diagram of a phase signal applied to a method for signal transmission according to an embodiment of the present application.

FIG. 3 is a schematic diagram of a phase signal used for binary code according to an embodiment of the present application. As illustrated in FIG. 3, a first phase signal and a second phase signal may be, for example, sine wave signals with an initial phase difference of 180°. Of course, FIG. 3 is merely a possible example of a phase signal used in the phase encoding, and the initial phase difference between the first phase signal and the second phase signal may also be other number, which will not be further detailed herein.

In an example, after acquiring the binary code of the information to be transmitted, the binary number "0" of the binary code is phase encoded using the first phase signal illustrated in FIG. 3, and the binary number "1" of the binary code is phase encoded using the second phase signal illustrated in FIG. 3, and then the encoded signal is obtained.

In another example, after acquiring the binary code of the information to be transmitted, the binary number "0" of the binary code is phase encoded using the second phase signal illustrated in FIG. 3, and the binary number "1" of the binary code is phase encoded using the first phase signal illustrated in FIG. 3, and then the encoded signal is obtained.

Optionally, the information to be transmitted of the active stylus may include: stylus tip pressure information of the active stylus and/or function key pressing information of the active stylus, etc.

S202: transmitting a stylus tip signal, where the stylus tip signal includes the encoded signal.

In this method, after S201 as described is performed, the encoded signal may be obtained, and the stylus tip signal is obtained according to the encoded signal, so that the encoded signal is included in the stylus tip signal.

For example. in this method, the stylus tip signal may be obtained directly according to the encoded signal, or the stylus tip signal may be obtained according to the encoded signal and other signal.

The stylus tip signal may also be referred to as a stylus tip driving signal or a driving signal.

After acquiring the stylus tip signal, the active stylus, when in contact with the touch control screen, may couple the stylus tip signal to the touch control chip through the coupling capacitance between the stylus tip and the touch control sensors of the touch control screen, to implement the transmission of the stylus tip signal.

In the method for signal transmission according to this embodiment of the present application, the information to be transmitted may be phase encoded using the preset phase signal to obtain the encoded signal, and the stylus tip signal including the encoded signal is transmitted. In this method, since the encoded signal in the stylus tip signal is encoded according to the phase signal, there is no need to set a time interval between different information in the encoded signal, therefore, time occupied by an ineffective signal in the stylus tip signal may be reduced, so that the active stylus can continuously transmits information in the driving time, which enables the active stylus to transmits more information in the effective driving time.

In addition, for different radix of the information to be transmitted, different phase signals may be used for encoding, so that fewer digits transmit more information.

Figure 4:
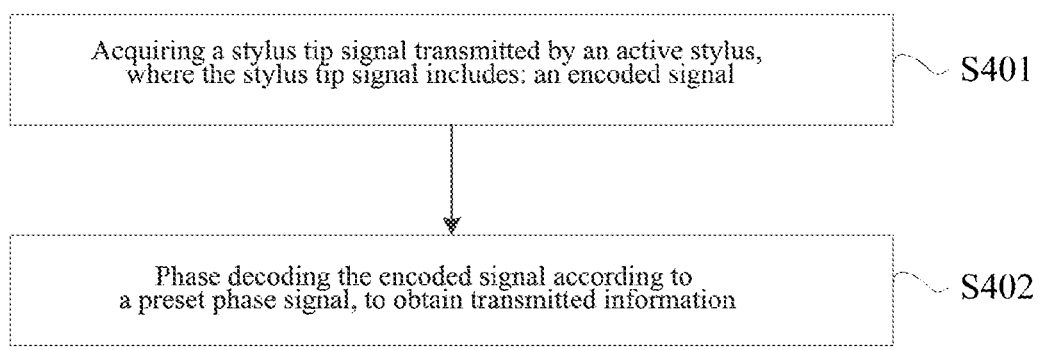
FIG. 4 is a flowchart of a method for signal reception according to an embodiment of the present application.

Embodiments of the present application further provide a method for signal reception. The method for signal reception may be applied to an electronic device with a touch control screen. The electronic device with the touch control screen may at least include the touch control screen 1, the touch control chip 3 and the host 4 in the touch control system according to any one of FIG. 1A to FIG. 1C. Of course, the electronic device may also include other components, which will not be detailed herein. FIG. 4 is a flowchart of a method for signal reception according to an embodiment of the present application. The method for signal reception may be implemented by the electronic device through a software and/or hardware form. As illustrated in FIG. 4, the method for signal reception may include:

S401: acquiring a stylus tip signal transmitted by an active stylus, where the stylus tip signal includes: an encoded signal.

In S401, the stylus tip signal transmitted by the active stylus may be acquired through a coupling capacitance between touch control sensors on a touch control screen and a stylus tip of the active stylus.

S402: phase decoding the encoded signal according to a preset phase signal, to obtain transmitted information.

The preset phase signal used at an electronic device side, which is also referred to as a screen end, may be the same as the phase signal used at the active stylus side, which is also referred to as a stylus-end. For the detailed description, reference is made to the above, which will not be repeated herein.

The stylus tip signal transmitted by the active stylus may be an analog signal, so the encoded signal may be an analog encoded signal. Code information of the transmitted information such as a multi-ary code of the transmitted information may be obtained by phase decoding the encoded signal.

In this method, the encoded signal may be decoded by phase demodulating each code of the received signal according to a preset relationship between the phase and the code.

For example, binary coding is taken as an example for illustration. In the binary coding as described above, if it is preset that the phase 0° corresponds to the binary number "0", the preset phase 180° corresponds to the binary number "1". Each code signal in the received signal is phase demodulated, for example, if a phase of a certain code signal is 0°, the code signal corresponds to the binary number "0", and if a phase of a certain code signal is 180°, the code signal corresponds to the binary number "1", and then all binary codes of the transmitted information are obtained.

It should be noted, in this method, the phase decoding may be performed by a touch control chip of the electronic device or a host of the electronic device. That is, S402 may be performed by the touch control chip of the electronic device or the host of the electronic device.

After obtaining the transmitted information, a corresponding touch control operation may be performed according to the transmitted information.

Optionally, the transmitted information may include: stylus tip pressure information of the active stylus and/or function key pressing information of the active stylus s, etc.

After the electronic device performs S402 to obtain the transmitted information, the electronic device may determine the stylus tip pressure information of the active stylus and/or the function key pressing information of the active stylus, etc. according to the transmitted information, and then the electronic device performs the corresponding touch control operation according to the stylus tip pressure information of the active stylus and/or the function key pressing information of the active stylus.

In the method for signal reception according to this embodiment of the present application, the stylus tip signal transmitted by the active stylus may be acquired, where the stylus tip signal includes the encoded signal, and the encoded signal is phase decoded according to the preset phase signal to obtain the transmitted information. In this method, since the encoded signal in the stylus tip signal is encoded according to the phase signal, there is no need to set a time interval between different information in the encoded signal, therefore, time occupied by an ineffective signal in the stylus tip signal may be reduced, so that the active stylus can continuously transmits information in the driving time, which enables the active stylus to transmits more information in the effective driving time. In addition, using fewer encoding digits to transmit more information can be achieved by using more phases to perform multi-ary encoding.

Optionally, based on the method for signal transmission illustrated in FIG. 2, before the stylus tip signal is transmitted in S202, the method may further include:

obtaining the stylus tip signal according to the encoded signal and a preset beacon code signal, where the beacon code signal is used to determine a touch control position of the active stylus on the touch control screen.

The preset beacon code signal may be a preset waveform signal, for example, a preset sine wave signal.

Optionally, the beacon code signal may include: a first beacon code signal and/or a second beacon code signal. The first beacon code signal and the second beacon code signal may be a preset same waveform signal or different waveform signals.

The first beacon code signal may be referred to as a header code signal, which is located in front of the encoded signal in the stylus tip signal, and the second beacon code signal may be referred to as a rear code signal, which is located behind the encoded signal in the stylus tip signal.

Optionally, the obtaining the stylus tip signal according to the encoded signal and a preset beacon code signal in the above method may include:

obtaining the stylus tip signal according to the encoded signal, a preset beacon code signal and a null code signal.

The null code signal is used to determine a start time or an end time of the beacon code signal, and then the stylus tip signal and the touch control screen are timing-synchronized.

Since the active stylus and the touch control screen use two clock systems, the electronic device needs to perform timing synchronization after acquiring the stylus tip signal transmitted by the active stylus. In order to facilitate timing synchronization between the active stylus and the touch control screen, the active stylus may include the null code signal in the transmitted stylus tip signal. The electronic device may determine the start time or the end time of the beacon code signal according to the null code signal, and then after the time synchronization between the active stylus and the touch control screen is performed, the electronic device can more accurately determine a driving start time of the active stylus, and also accurately identify positions of signals of different codes in the stylus tip signal at the same time.

The null code signal, as the name implies, is a signal with null code, that is, the active stylus does not transmit any signal or generate any driving signal in the null code signal. During a time period of the null code signal, the electronic device may also perform operations such as touch control identification of the finger.

Based on any one of the methods for signal transmission described above, the information to be transmitted may include: information to be transmitted of the active stylus and a preset check code.

The check code may be used to verify the information to be transmitted of the information to be transmitted, and eliminate decoding error information caused by interference and the like.

The check code may be located at a fixed position in the stylus tip signal.

The check code may be a fixed check code or a variable check code.

If the check code is the fixed check code, the check code may be a preset binary number "0" or "1". If the check code is the variable check code, the check code may be determined according to the information to be transmitted of the active stylus, and it may vary with the information to be transmitted of the active stylus such as pressure information and/or key information.

For example, the check code may be, for example, a parity code determined according to the information to be transmitted of the active stylus.

After obtaining the stylus tip signal, the electronic device phase decodes the encoded signal according to the preset phase signal to obtain the transmitted information of the active stylus and the check code, and checks the transmitted information of the active stylus according to the check code. If the checking is passed, the electronic device may perform a corresponding touch control operation according to the transmitted information of the active stylus.

In this method, the check code can also be combined to eliminate erroneous decoding and reduce a false positive rate.

Optionally, based on any one of the methods for signal transmission as described above, the transmitting the stylus tip signal in S202 may include:

transmitting the stylus tip signal using a mode in which interaction is performed at multiple driving frequencies.

It is assumed that if the multiple driving frequencies include two driving frequencies, the active stylus may transmit the stylus tip signal in at least one period corresponding to a first driving frequency, and transmits the stylus tip signal in least one period corresponding to a second driving frequency.

When the electronic device detects there is no interference on the multiple driving frequencies, the acquired stylus tip signal is decoded using the multiple driving frequencies to enable the electronic device to obtain the transmitted information in the stylus tip signal, for example, the stylus tip pressure information and/or the function key pressing information. In this situation, refresh rates of the pressure and/or the key information and coordinate information can be made unchanged.

When an electronic device detects that interference on one of the multiple driving frequencies is big, the electronic device may abandon a stylus tip signal corresponding to that driving frequency, and reduce a refresh rate of the electronic device, thereby improving anti-interference ability.

In this method, the stylus tip signal is transmitted using the mode in which interaction is performed at multiple driving frequencies, and thus the anti-interference ability of the electronic device can be effectively improved.

Figure 5:
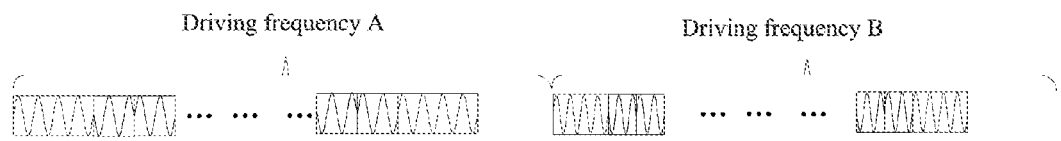
FIG. 5 is a diagram of a corresponding relationship between a stylus tip signal and driving frequencies according to an embodiment of the present application.

FIG. 5 is a diagram of a corresponding relationship between a stylus tip signal and driving frequencies according to an embodiment of the present application. As illustrated in FIG. 5, the active stylus may transmit the stylus tip signal in at least one period corresponding to a driving frequency A, and transmit the stylus tip signal in at least one period corresponding to a driving frequency B.

When the electronic device detects there is no interference on the driving frequency A and the driving frequency B, the acquired stylus tip signal is decoded using the driving frequency A and the driving frequency B. In this situation, refresh rates of the pressure and/or the key information and coordinate information can be made unchanged.

When the electronic device detects that interference on one of the driving frequency A and the driving frequency B is big, the electronic device may abandon a stylus tip signal corresponding to that driving frequency, and reduce a refresh rate of the touch control screen to ½ of an original refresh rate, so as to improve anti-interference ability.

Figure 6:
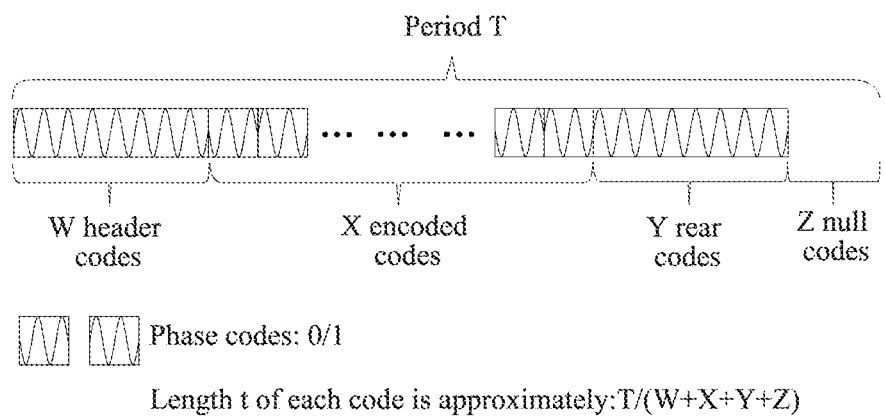
FIG. 6 is a schematic diagram of a stylus tip signal transmitted by an active stylus according to an embodiment of the present application.

In the following, the stylus tip signal transmitted by the active stylus is illustrated in combination with examples. FIG. 6 is a schematic diagram of a stylus tip signal transmitted by an active stylus according to an embodiment of the present application. As illustrated in FIG. 6, in each period T, the stylus tip signal transmitted by the active stylus may include: W header code signals, X encoded and check code signals, Y rear code signals and Z null code signals. The length t of each code is T/(W+X+Y+Z). The W header code signals and the Y rear code signals may be used to perform timing synchronization between the screen-end and the stylus-end and determine the touch control position of the stylus tip of the active stylus on the touch control screen, for example, a coordinate position.

The X encoded signals may include a pressure code signal and/or a key code signal, where the pressure code signal may be used to transmit the pressure information of the stylus tip of the active stylus, and the key code signal may be used to transmit the function key pressing information of the active stylus. For example, if the stylus tip pressure information of the active stylus includes 4096 levels of pressure information, for transmitting the pressure information, when binary coding is used, the X encoded signals include at least 12 pressure code signals, and when a quaternary code is used, the X encoded signals only need to include 6 pressure code signals.

The X encoded signals may include at least one check code signal, where the at least one check code signal may be located at a preset position in the encoded signal. The at least one check code signal may be used to make the electronic device check the information such as the pressure code signal and/or the key code signal in the received stylus tip signal, to check whether the information such as the pressure code signal and/or the key code signal in the stylus tip signal is accurate.

If the check code signal is a fixed check code signal, the check code signal may be an encoded signal at a preset fixed position in the stylus tip signal. If the check code signal is a variable check code signal, the check code signal may be, for example, a check code signal determined according to the information such as the pressure code signal and/or the key code signal, for example, a signal of a parity check code.

During a period of the Z null code signals, the active stylus does not generate any driving signal, that is, the active stylus does not transmit a signal, which can make the electronic device perform a touch control detection of the finger. It should be noted that, in the stylus tip signal illustrated in FIG. 6, relative positions and included types of the header code signals, rear code signals, the encoded signals and the null code signals is only a possible example, and it may also be different from what is illustrated in FIG. 6.

In each driving period T as illustrated in FIG. 6, the X encoded signals in the stylus tip signal may be encoded signals obtained after phase encoding is performed according to a preset phase signal. For different codes, different phase signals may be used for encoding.

In this method, since the encoded signal in the stylus tip signal is encoded according to the phase signal, there is no need to set a time interval between different information in the encoded signal, therefore, time occupied by an ineffective signal in the stylus tip signal may be reduced, so that the active stylus can continuously transmits information in the driving time, which enables the active stylus to transmits more information in the effective driving time. And using fewer encoding digits to transmit more information can be achieved by using multiple phases to perform multi-ary encoding.

Correspondingly, based on the method for signal reception as illustrated in FIG. 4, the stylus tip signal acquired by performing S401 may include: an encoded signal and a preset beacon code signal. The method may further include:

determining a touch control position of the active stylus on the touch control screen according to the beacon code signal.

After acquiring the stylus tip signal, the electronic device determines the touch control position of the active stylus on the touch control screen, which is also referred to as a touch control coordinate or a coordinate position, according to the beacon code signal in the stylus tip signal.

The touch control position of the active stylus on the touch control screen may be a position of a transmitting sensor and a receiving sensor where the stylus tip of the active stylus is located on the touch control screen.

For example, the determining a touch control position of the active stylus on the touch control screen according to the beacon code signal as described above may include:

performing in-phase quadrature (IQ, for short) demodulation of the beacon code signal, to obtain a first demodulation amplitude; and determining the touch control position of the active stylus on the touch control screen, according to the first demodulation amplitude.

Optionally, the beacon code signal includes: a first beacon code signal and/or a second beacon code signal, where the first beacon code signal is located in the stylus tip signal and in front of the encoded signal, and the second beacon code signal is located in the stylus tip signal and behind the encoded signal.

In this method, the IQ demodulation may be performed on the beacon code signal, to obtain the first demodulation amplitude, and if the demodulation amplitude is greater than or equal to a preset value, the touch control position of the active stylus on the touch control screen may be determined according to the first demodulation amplitude. The first demodulation amplitude may be an amplitude of the beacon code signal.

The electronic device may demodulate the first beacon code signal and may also demodulate the second beacon code signal, and the electronic device may also splice the first beacon code signal and the second beacon code signal and then perform demodulation.

Figure 7:
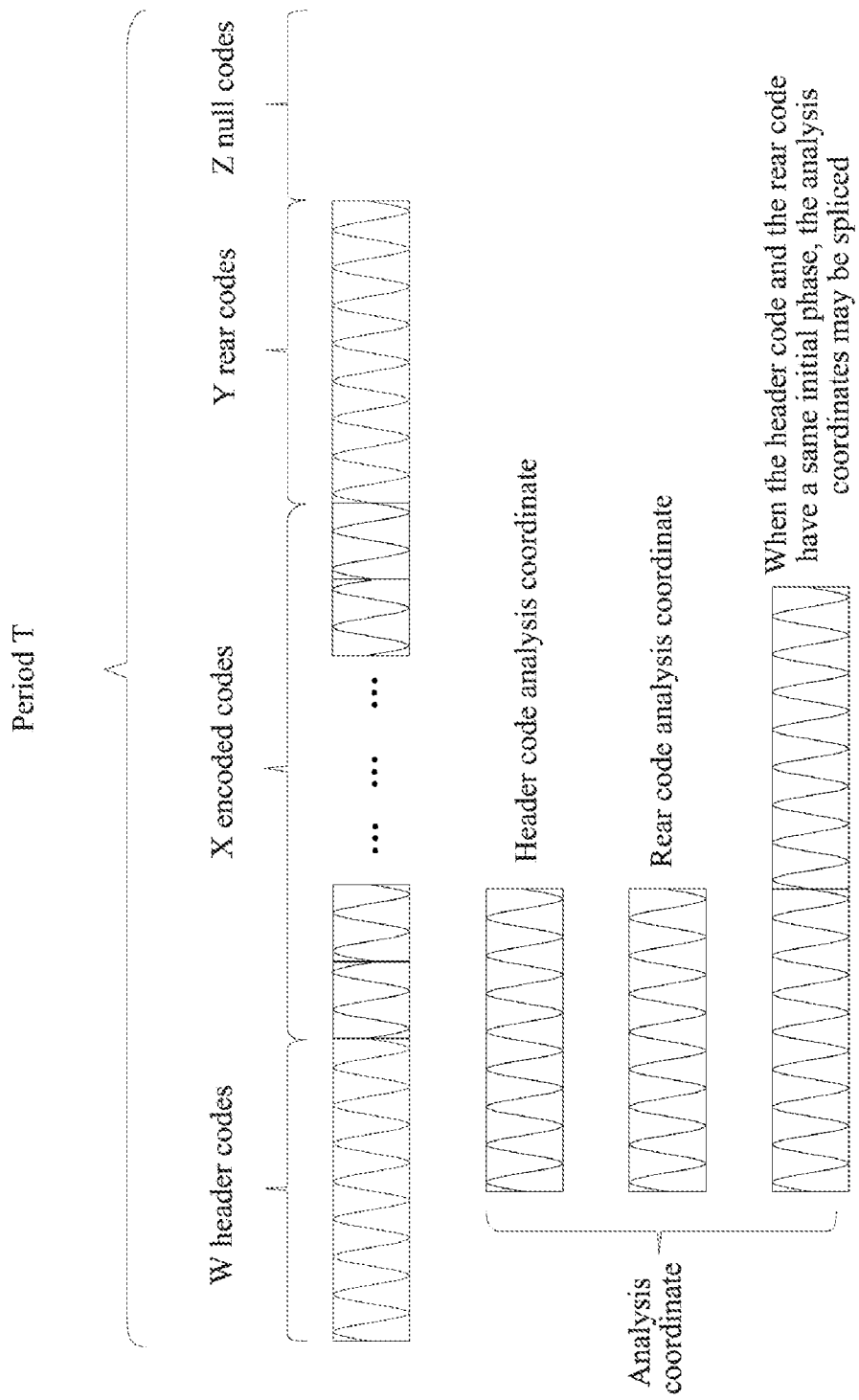
FIG. 7 is a schematic diagram of demodulation of a beacon code signal in a method for signal reception according to an embodiment of the present application.

FIG. 7 is a schematic diagram of demodulation of a beacon code signal in a method for signal reception according to an embodiment of the present application. It is assumed that, in each driving period T, the stylus tip signal acquired by the electronic device includes: W header code signals, X encoded and check code signals, Y rear code signals and Z null code signals.

In an example, the electronic device may determine a header code amplitude by performing the IQ demodulation on the header code signal, and determine the coordinate position of the stylus tip of the active stylus on the touch control screen according to the header code amplitude.

In another example, the electronic device may determine a rear code amplitude by performing the IQ demodulation on the rear code signal, and determine the coordinate position of the stylus tip of the active stylus on the touch control screen according to the rear code amplitude.

In yet another example, the electronic device may splice the header code signal and the rear code signal, perform the IQ demodulation on the spliced signal to obtain amplitudes of the header code and the rear code, and determine the coordinate position of the stylus tip of the active stylus on the touch control screen according to the amplitudes of the header code and the rear code.

Optionally, based on any one of the methods for signal reception as described above, the stylus tip signal may further include: a null code signal.

The method for signal reception may further include:

determining a start time and an end time of the beacon code signal, according to the null code signal; and performing timing synchronization on the stylus tip signal and the touch control screen, according to the start time and the end time of the beacon code signal.

For example, in the above method, the determining a start time and an end time of the beacon code signal, according to the null code signal may include:

performing the IQ demodulation on a signal within a preset code length time including the null code signal in the stylus tip signal, to obtain a second demodulation amplitude; and determining the start time and the end time of the beacon code signal, according to the second demodulation amplitude.

The second demodulation amplitude may be an amplitude of the signal within the preset code length time including the null code signal.

The signal within the preset code length time including the null code signal may be referred to as null code attached signal in the stylus tip signal.

After determining the second demodulation amplitude, the electronic device may determine an amplitude change within the preset time according to the second demodulation amplitude, and determine the start time and the end time of the beacon code signal according to the amplitude change. For example, if the amplitude change within the preset time is a decrease in the amplitude, then the end time of the beacon code, that is, the end time of the rear code signal is determined, and if the preset time is an increase in the amplitude, the start time of the beacon code may be determined, for example, the start time of the header code is determined.

Figure 8:
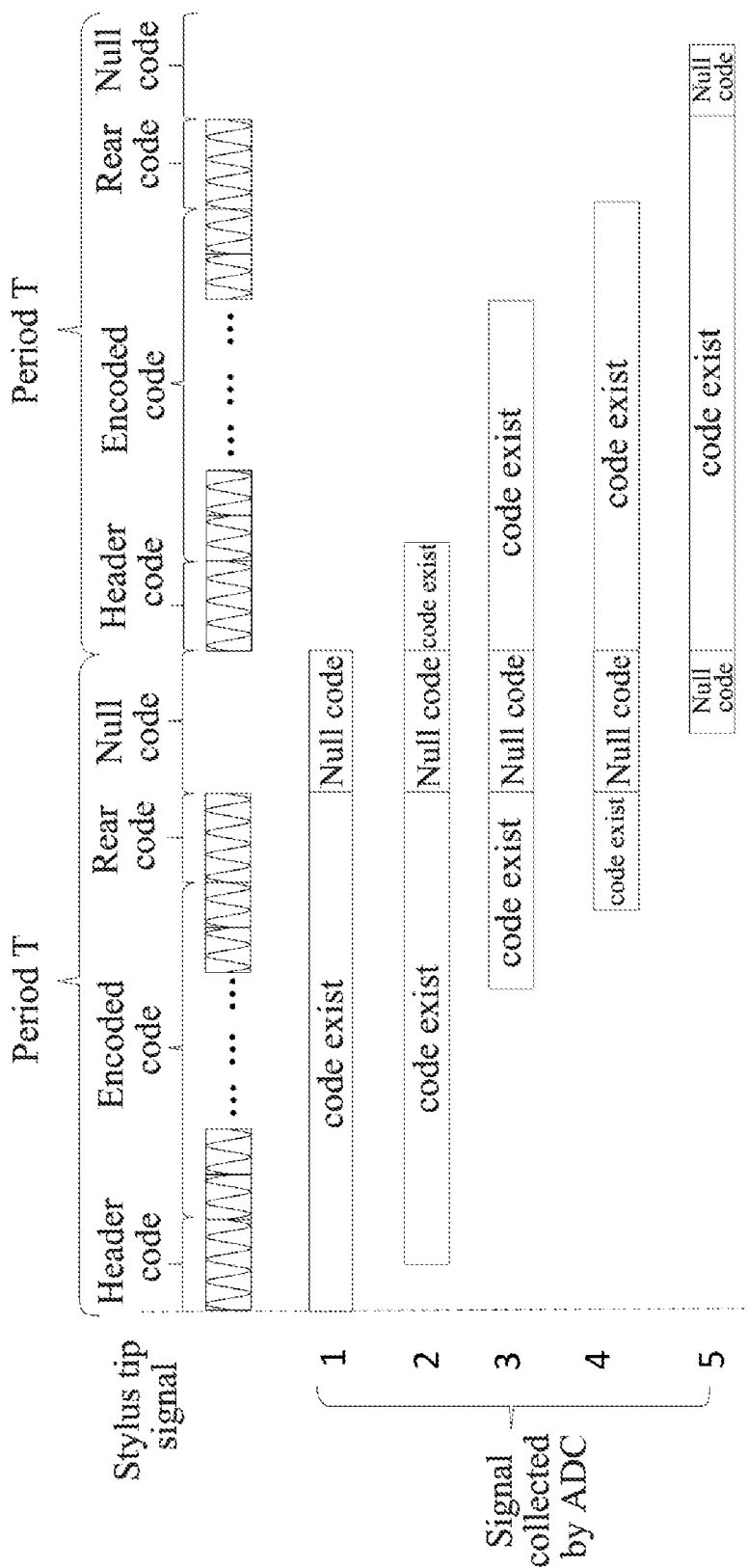
FIG. 8 is a diagram of a relationship of a signal sampled by an ADC with respect to a stylus tip signal in a method for signal reception according to an embodiment of the present application.

For example, FIG. 8 is a diagram a relationship of a signal sampled by an ADC with respect to a stylus tip signal in a method for signal reception according to an embodiment of the present application. The ADC in the electronic device may collect signals outputted by AFE circuits connected with all the touch control sensors such as receiving sensors on the touch control screen. When the stylus tip of the active stylus is in contact with any position of the touch control screen, the stylus tip signal may be collected by the ADC. The duration of each signal collection by the ADC is a preset stylus tip signal period T, also referred to as a period T. When the stylus tip signal is collected by the ADC of the electronic device, there are five cases shown in FIG. 8 between the signal collected by the ADC and the stylus tip signal that is periodically transmitted by the active stylus.

Case 1: the signal collected by the ADC may be aligned with the stylus tip signal transmitted by the active stylus.

Case 2: the signal collected by the ADC may include: complete rear code signals, complete encoded signals, complete null code signals and a small number of header code signals.

Case 3: the signal collected by the ADC may include: complete rear code signals, complete null code signals, complete header code signals and part of encoded signals.

Case 4: the signal collected by the ADC may include: part of rear code signals, complete null code signals, complete header code signals and part of encoded signals.

Case 5: the signal collected by the ADC may include: part of null code signals, for example, ½ of null code signals, complete header code signals, complete encoded signals, complete null code signals and ½ of null code signals in a next period.

The five cases described above may be further divided into two categories: 1. complete null code signals, complete rear code signals and/or complete header code signals; 2. ½ of a null code signal, complete header code signals and/or rear code signals.

Since the stylus tip signal collected by the ADC may not be aligned with the stylus tip signal transmitted by the active stylus, that is, any one of Case 2 to Case 5 illustrated in FIG. 8 may exist, it is necessary that the start time of the header code signal or the end time of the rear code signal of the stylus tip signal can be determined, and then the timing-synchronization is performed on the collected stylus tip signal.

Figure 9:
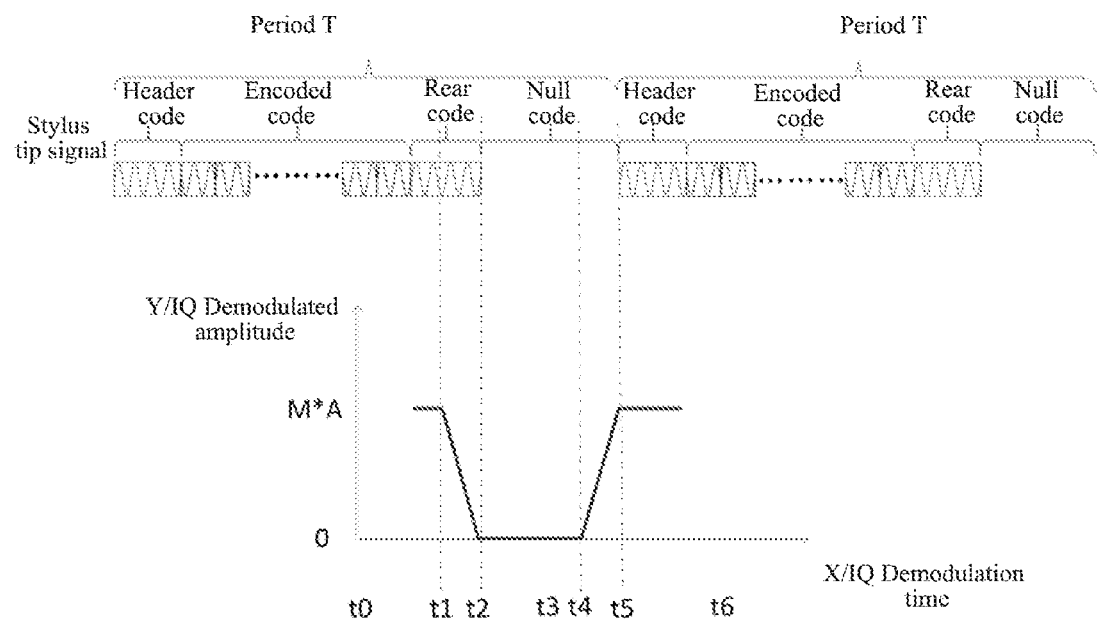
FIG. 9 is a diagram of a corresponding relationship between a demodulation amplitude and a time according to an embodiment of the present application.

FIG. 9 is a diagram of a corresponding relationship between a demodulated amplitude and a time according to an embodiment of the present application. As illustrated in FIG. 9, it is assumed that, in each coding period T, the stylus tip signal acquired by the electronic device includes: W header code signals, X encoded and check code signals, Y rear code signals and Z null code signals.

In a preset demodulation duration, the electronic device may perform IQ demodulation on a signal in the demodulation duration, to obtain a demodulated amplitude. The demodulation duration may be a duration of M code lengths. In the demodulation duration, if the signal is continuous, the demodulation amplitude is a maximum value M*A and is unchanged. A is a demodulated amplitude in a single code length. For example, in demodulation durations t0-t1 and t5-t6, the signal is continuous, and the demodulated amplitude of the maximum value M*A may be obtained by demodulation. When part of the demodulation duration is a continuous signal and part of the demodulation duration is a null code signal, the longer the duration of the null code signal is, the smaller the demodulated amplitude is, for example, in t1-t2 and t4-t5. When the entire demodulation duration is a null code signal, the demodulation amplitude is 0, for example, in t2-t4.

If Z/2−1>M and M<min(W,Y) (W, Y and Z are numbers of the header code signals, the rear code signals and the null code signals are described above), the IQ demodulation may performed on the signal sampled by the ADC of the electronic device as illustrated in FIG. 9 at a preset step interval from the start time, and there will always have a duration that data changes from M*A to 0 or changes from 0 to M*A, and the data will stays at M*A and 0 or a while. Staying at M*A and 0 is for preventing misidentification. For example, when an initial phase difference between phase signals for phase encoding of different binary codes is 180°, in order to prevent that an encoding phase is misidentified as a null code phase in case of special codes, such as 101010 . . . , M may be an odd number and an amplitude detected in the null signals is 0 and stays 0 for a while, so that the misidentification will not occur.

Where the demodulated amplitude is M*A may be the rear code signals or the header code signals, and where the demodulated amplitude is 0 is the null code signal. According to that the demodulated amplitude changes from M*A to 0, the end time of the rear code signals may be determined, and according to that the demodulated amplitude changes from 0 to M*A, the start time of the header code signals may be determined.

Figure 10:
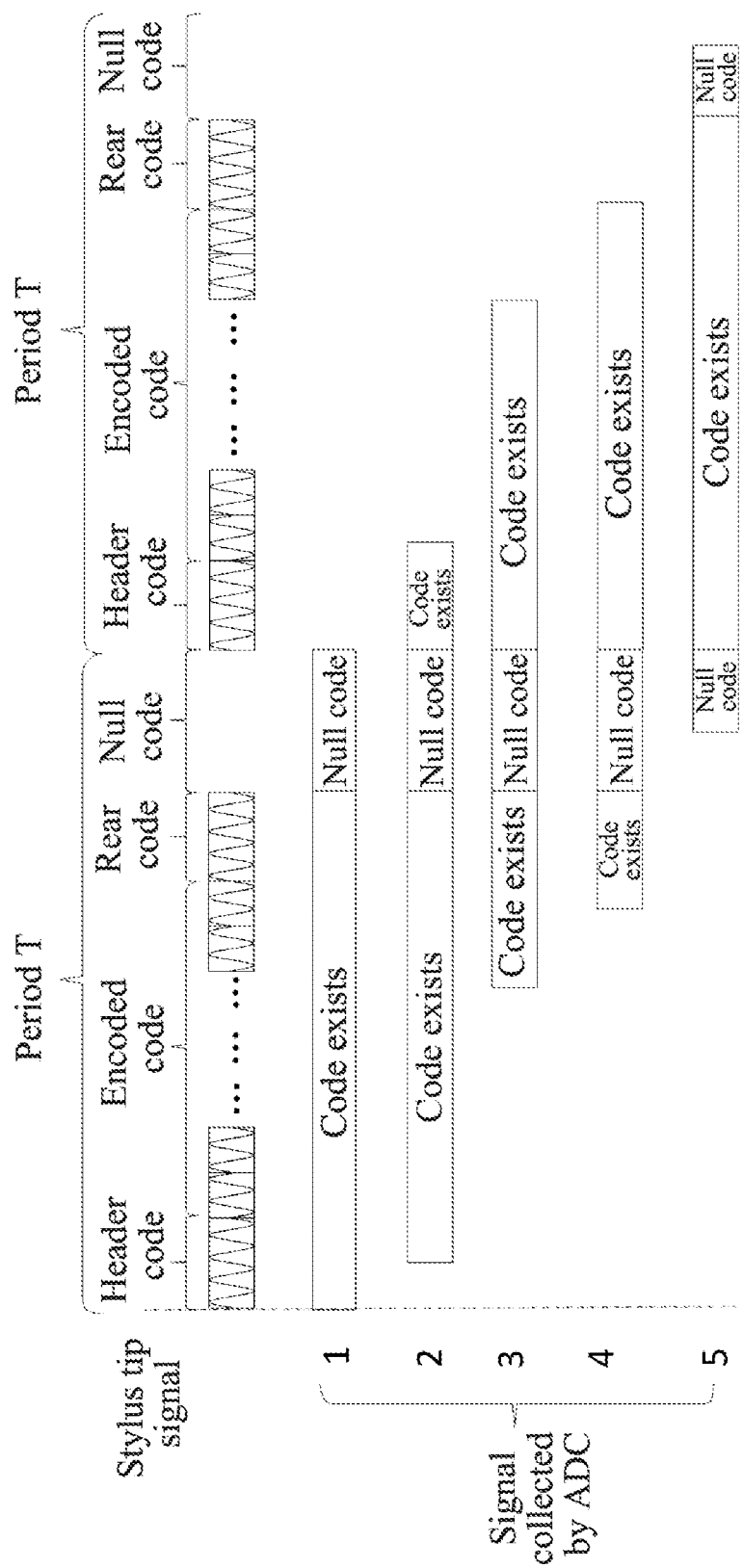
FIG. 10 is a diagram of a corresponding relationship between a demodulation amplitude and a time in a method for signal reception according to an embodiment of the present application.

FIG. 10 is a diagram of a corresponding relationship between a demodulation amplitude and a time in a method for signal reception according to an embodiment of the present application. It is assumed that, through the method illustrated in FIG. 9, positions of the start time of the header code signals and the end time of the rear code signals in the stylus tip signal collected by the ADC may be obtained, and then a time deviation of the stylus tip signal collected by the ADC with respect to an ideal ADC collection signal may be determined. The ideal ADC collection signal may be the stylus tip signal transmitted by the active stylus.

As illustrated in FIG. 10, in an ideal situation, the position of the end time of the rear code signals in the stylus tip signal collected by the ADC may be $t0=t_{header\ code}+t_{encoded\ code}+t_{rear\ code}$. When it is detected that the position of the end time of the rear code signals in the stylus tip signal is t1, the time deviation of the stylus tip signal collected by the ADC with respect to the ideal stylus tip signal may be determined, and a sampling start time of the ADC may be backwardly shifted by t0-t1, so that the timing-synchronization of the stylus tip signal collected by the ADC may be realized.

In the ideal situation, the start time of the header code signals in the stylus tip signal collected by the ADC is time 0, when the start time of the header code signals in the stylus tip signal collected by the ADC is t2, the time deviation of the stylus tip signal collected by the ADC with respect to the ideal stylus tip signal may be determined, and the start time of the sampling time of the ADC may be backwardly shifted by T−t2, so that the timing-synchronization of the stylus tip signal collected by the ADC may be realized.

After the timing-synchronization of the stylus tip signal collected by the ADC, the ADC may collect data of each AFE circuit, and a collection duration of each AFE circuit may be the preset duration T. After collecting the stylus tip signal transmitted by the AFE circuit, the ADC may transmit the stylus tip signal to the touch control chip, and the touch control chip may phase demodulate the stylus tip signal to determine the touch control position of the stylus tip on the touch control screen and the transmitted information in the stylus tip signal, such as the stylus tip pressure information and/or the function key information.

Optionally, the transmitted information may be obtained by performing S402 in the method for signal reception as described above, where the transmitted information may include: transmitted information of the active stylus and a preset check code. The transmitted information of the active stylus may include: stylus tip pressure information and/or function key information.

The description of the check code may be referred to above, which will not be repeated herein.

The method for signal reception may further include:

checking the transmitted information of the active stylus according to the check code.

If the checking is passed, it may be determined that decoding of the transmitted information of the active stylus in the received stylus tip information is accurate, and then the transmitted information of the active stylus is reported, that is, a point is reported. If the checking is not passed, it may be determined that decoding of the transmitted information of the active stylus in the received stylus tip information is not accurate, and then the stylus tip signal acquired in that period may be abandoned.

Figure 11:
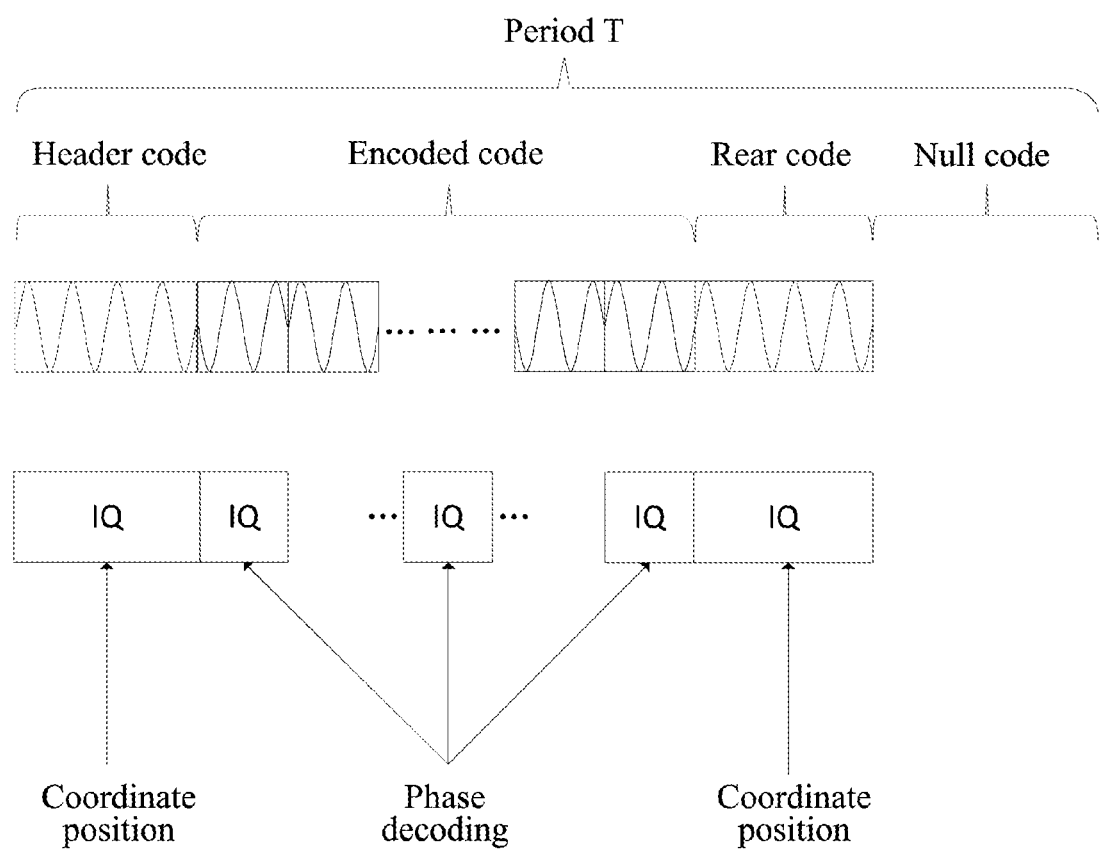
FIG. 11 is a diagram of a corresponding relationship between a demodulation amplitude and a time in a method for signal reception according to an embodiment of the present application.

For example, FIG. 11 is a diagram of a corresponding relationship between a demodulated amplitude and a time in a method for signal reception according to an embodiment of the present application.

As illustrated in FIG. 11, the electronic device may demodulate the header code signals and/or the rear code signals in the stylus tip signal using the IQ demodulation to determine the demodulation amplitude, and determine the coordinate position of the stylus tip of the active stylus on the touch control screen, such as the position of the touch control sensor corresponding to the touch control screen where the stylus tip is at. When the demodulated amplitude is greater than or equal to a preset value, the coordinate position of the stylus tip of the active stylus on the touch control screen may be determined.

The electronic device further demodulates the encoded signals in the stylus tip signal to determine the phase of each encoded signal in the encoded signal, and then the codes corresponding to the encoded signals, also referred to as an encoding sequence, is determined according to the preset corresponding relationship between the phase and the code, and then according to the codes corresponding to the encoded signals, the transmitted information may be determined, that is, the stylus tip pressure information and/or the function key pressing information, etc. At the same time, whether the stylus tip signal collected in the period T is correct is determined according to the check code.

In an implementation, the phase decoding the encoded signal according to a preset phase signal, to obtain transmitted information in S204 as described above includes:

performing the IQ demodulation on each encoded signal in the stylus tip signal, to obtain phase information by demodulation; and analyzing the phase information of each encoding signal according to the preset phase signal.

In another implementation, the phase decoding the encoded signal according to a preset phase signal, to obtain transmitted information in S204 as described above includes:

splicing each of the encoded signal and the beacon code signal in the stylus tip signal, to obtain a spliced signal; and analyzing the spliced signal according to the preset phase signal, to determine a code of each of the encoded signal; and the transmitted information includes: a code of at least one of the encoded signal in the stylus tip signal.

Performing splicing on each encoded signal and the beacon code signal and analysis increases an equivalent driving time and an equivalent driving voltage, which can effectively increase the anti-interference ability of signal analysis.

Figure 12:
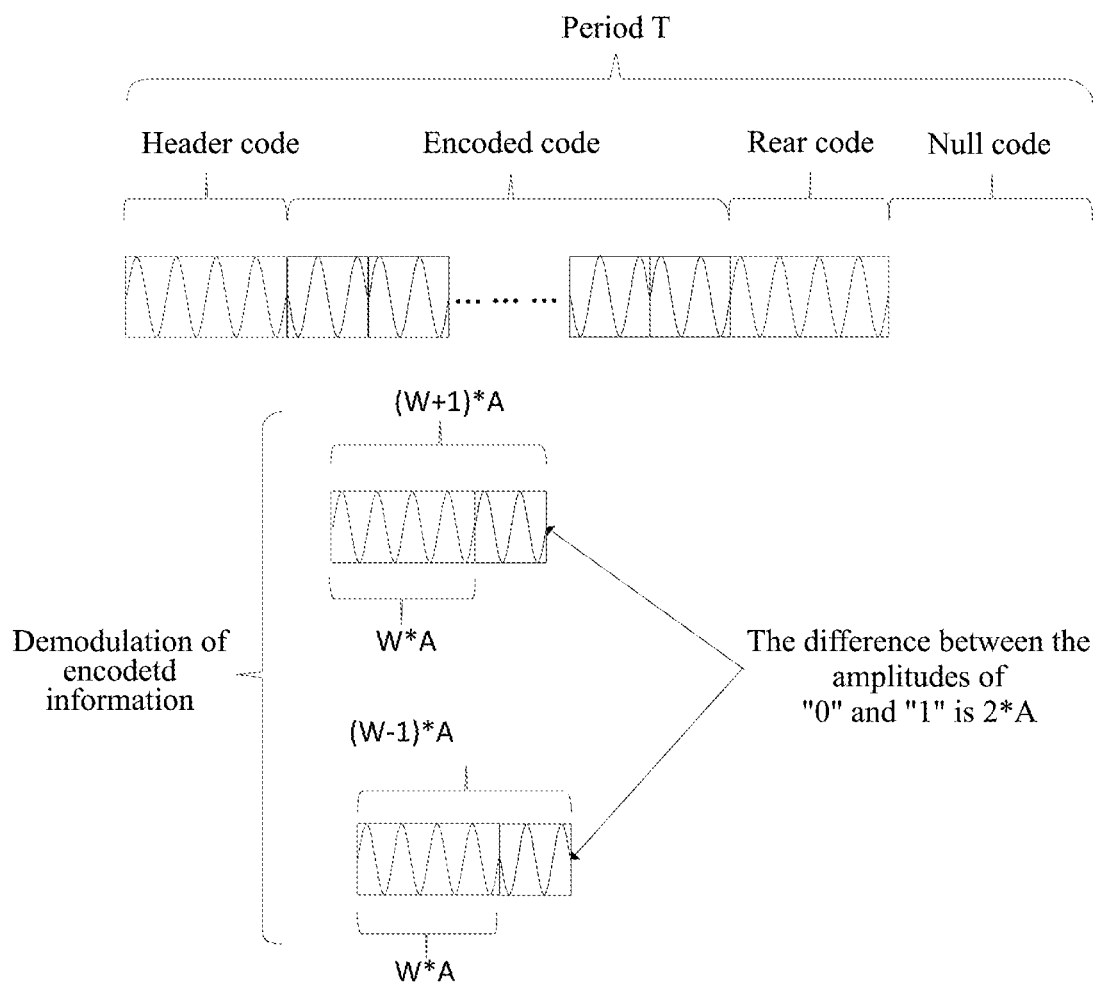
FIG. 12 is a schematic diagram of demodulating encoded information in a method for signal reception according to an embodiment of the present application.
Figure 13:
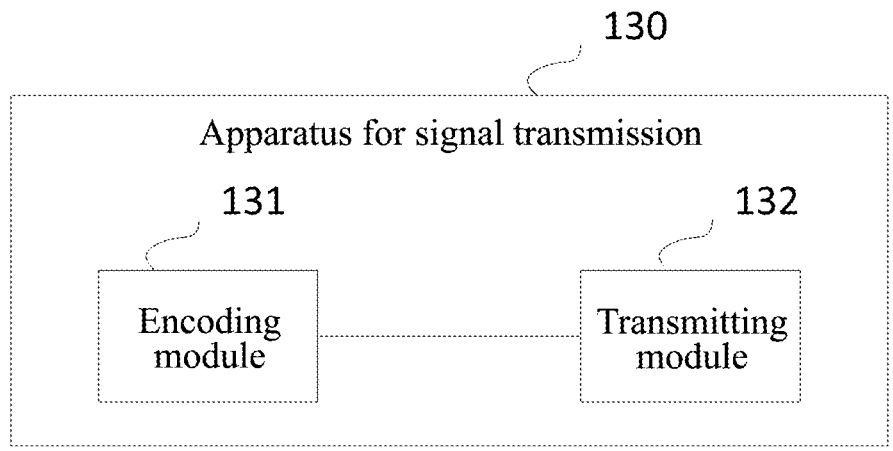
FIG. 13 is a schematic structural diagram of an apparatus for signal transmission according to an embodiment of the present application.

FIG. 12 is a schematic diagram of demodulating encoded information demodulation in a method for signal reception according to an embodiment of the present disclosure. When the number of encoded signals is big, since a single code length is generally short, the anti-interference ability in analyzing coding information using the IQ demodulation is poor. In some phase decoding manners, splicing a plurality of encoded signal and then performing the IQ demodulation can effectively increase the anti-interference ability. As illustrated in FIG. 13, for binary coding, when binary numbers "0" and "1" are respectively decoded using two phase signals with an initial phase difference of 180°, a same phase signal may be used for the header code signal and the rear code signal, for example, "0", the IQ demodulation may be performed using the header code signal, to determine the demodulated amplitude, and the coordinate position of the stylus tip of the active stylus on the touch control screen may be determined.

When analyzing the encoded signal in the stylus tip signal, the phase decoding may not be performed in the manner that the IQ demodulation is separately performed on each encoded signal as illustrated in FIG. 11. Instead, each encoded signal is spliced with the header code signals r, and the IQ demodulation is performed on W+1 code signals after the splicing. If a value obtained through performing the IQ demodulation on a single code length signal is A, a value obtained through performing the IQ demodulation on the header code signal is W*A. After splicing a certain encoded signal, if a value obtained through performing the IQ demodulation after the splicing is (W+1)*A, this digit encoded signal and the header code signal have a same initial phase, and a binary code corresponding to this digit of encoded signal is "0", and if a value obtained through performing the IQ demodulation after the splicing is (W−1)*A, this digit encoded signal and the header code signal have initial phases with a difference of 180°, the binary code corresponding to this digit of encoded signal is "1". It can be seen that, when it is known that the binary code of the encoded signal is either "0" or "1", an amplitude difference caused by codes of "0" and "1" is 2*A, an effective driving voltage is 2 times than before, and the demodulation or encoding duration is increased from a duration of 1 code to a duration of W+1 codes, which can effectively improve the anti-interference ability in signal analysis.

The embodiments of present application further provide an apparatus for signal transmission. The apparatus for signal transmission may be integrated on an active stylus in a software and/or hardware form. FIG. 13 is a schematic structural diagram of an apparatus for signal transmission according to an embodiment of the present application. As illustrated in FIG. 13, the apparatus for signal transmission 130 may include:

an encoding module 131, configured to phase encode information to be transmitted using a preset phase signal, to obtain an encoded signal; and a transmitting module 132, configured to transmit a stylus tip signal, where the stylus tip signal includes the encoded signal.

Optionally, the apparatus for signal transmitting 130 may further include:

a generating module, configured to obtain the stylus tip signal, according to the encoded signal and a preset beacon code signal;

where the beacon code signal is used to determine a touch control position of the active stylus on the touch control screen.

Optionally, the generating module is specifically configured to obtain the stylus tip signal according to the encoded signal, a preset beacon code signal and a null code signal.

The null code signal is used to determine a start time or an end time of the beacon code signal, and then to timing synchronize the stylus tip signal and the touch control screen Optionally, the beacon code signal includes: a first beacon code signal and/or a second beacon code signal.

The first beacon code signal is located in front of the encoded signal in the stylus tip signal, and the second beacon code signal is located behind the encoded signal in the stylus tip signal.

Optionally, the information to be transmitted includes: information to be transmitted of the active stylus and a preset check code;

the check code is used to check the information to be transmitted of the active stylus.

Optionally, the information to be transmitted of the active stylus includes: stylus tip pressure information of the active stylus and/or function key pressing information of the active stylus.

The apparatus for signal transmission according to this embodiment of the present application may implement the method for signal transmission performed by the active stylus according to any one of the above embodiments, for the specific implementation process and beneficial effects, reference is made to the above, which will not be repeated herein.

Figure 14:
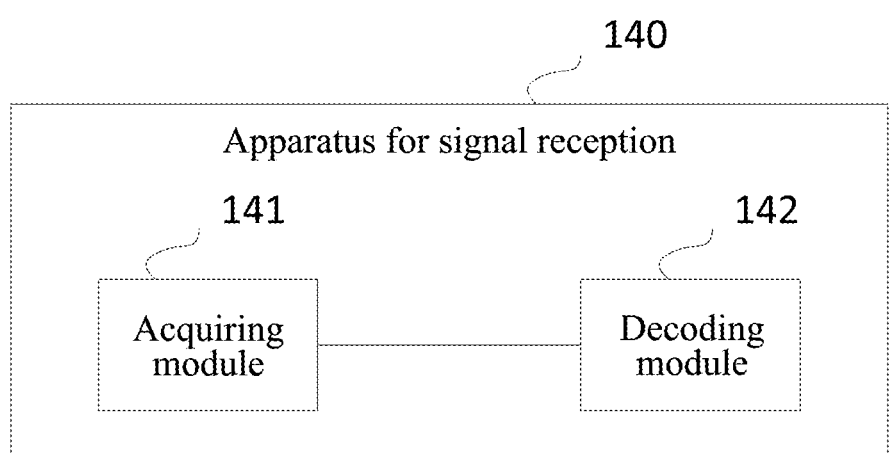
FIG. 14 is a schematic structural diagram of an apparatus for signal reception according to an embodiment of the present application.

The embodiments of present application further provide an apparatus for signal reception. The apparatus for signal reception may be integrated on an electronic device in a software and/or hardware form. FIG. 14 is a schematic structural diagram of an apparatus for signal reception according to an embodiment of the present application. As illustrated in FIG. 14, the apparatus for signal reception 140 may include:

an acquiring module 141, configured to acquire a stylus tip signal transmitted by an active stylus, where the stylus tip signal includes: an encoded signal; and a decoding module 142, configured to phase decode the encoded signal according to a preset phase signal, to obtain transmitted information.

Optionally, the stylus tip signal further includes: a preset beacon code signal.

Optionally, the apparatus for signal reception 140 may further include:

a first determining module, configured to determine a touch control position of the active stylus on the touch control screen, according to the beacon code signal.

Optionally, the first determining module is specifically configured to perform IQ demodulation of the beacon code signal, to obtain a first demodulated amplitude, and determine the touch control position of the active stylus on the touch control screen, according to the first demodulation amplitude.

Optionally, the stylus tip signal further includes: a null code signal.

The apparatus for signal reception 140 may further include:

a second determining module, configured to determine a start time and an end time of the beacon code signal, according to the null code signal; and a synchronizing module, configured to perform timing synchronization on the stylus tip signal and the touch control screen, according to the start time and the end time of the beacon code signal.

Optionally, the second determining module is specifically configured to perform the IQ demodulation on a signal within a preset code length time including the null code signal in the stylus tip signal, to obtain a second demodulated amplitude; and determine the start time and the end time of the beacon code signal, according to second demodulated amplitude.

Optionally, the decoding module 142 is specifically configured to perform the IQ demodulation on each of the encoded signal in the stylus tip signal, to obtain phase information by demodulation, and analyze the phase information of each of the encoded signal according to the preset phase signal, to determine a code of each of the encoded signal. The code of the transmitted information includes: a code of at least one encoded signal in the stylus tip signal.

Optionally, the decoding module 142 is specifically configured to splice each of the encoded signal and the beacon code signal in the stylus tip signal, to obtain a spliced signal; and analyze the spliced signal according to the preset phase signal, to determine a code of each of the encoded signal; and the transmitted information includes: a code of at least one of the encoded signal in the stylus tip signal.

Optionally, the beacon code signal includes: a first beacon code signal and/or a second beacon code signal;

where the first beacon code signal is located in front of the encoded signal in the stylus tip signal, and the second beacon code signal is located behind the encoded signal in the stylus tip signal.

Optionally, the code of the transmitted information includes: a code of the transmitted information of the active stylus and a preset check code.

The apparatus for signal reception 140 may further include:

a checking module, configured to check the code of the transmitted information of the active stylus, according to the check code.

Optionally, the transmitted information of the active stylus includes: stylus tip pressure information of the active stylus and/or function key pressing information of the active stylus.

The apparatus for signal reception according to this embodiment of the present application may implement the method for signal reception performed by the electronic device according to any one of the above embodiments, for the specific implementation process and beneficial effects, reference is made to the above, which will not be repeated herein.

Figure 15:
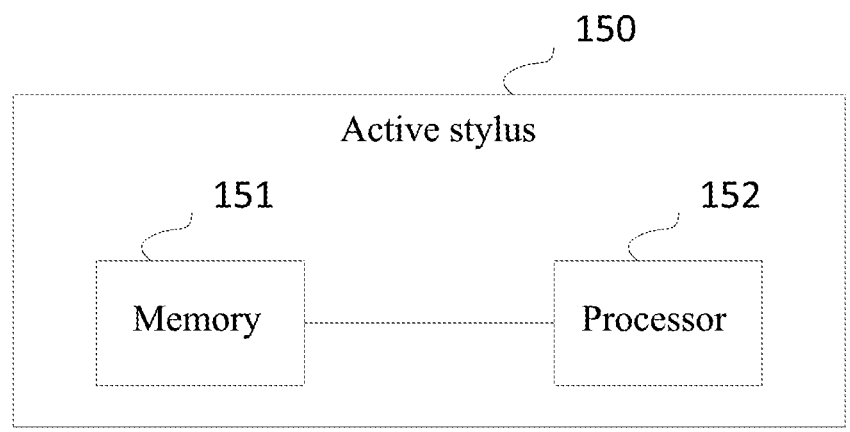
FIG. 15 is a schematic structural diagram of an active stylus according to an embodiment of the present application.

The embodiments of the present application further provide an active stylus. FIG. 15 is a schematic structural diagram of an active stylus according to an embodiment of the present application. As illustrated in FIG. 15, the active stylus 150 may include a memory 151 and a processor 152. The memory 151 is coupled to the processor 152.

The memory 151 is configured to store a program instruction.

The processor 152 is configured to invoke the program instruction stored in the memory, to cause the active stylus to perform any one of the methods for signal transmission as described above.

The embodiments of the present application may further provide a computer readable storage medium having a computer program stored thereon, which when executed by the processor 152, implements the any one of the methods for signal transmission as described above.

The active stylus and the computer readable storage medium according to this embodiment of the present application may implement the method for signal transmission performed by the active stylus according to any one of the above embodiments, for the specific implementation process and beneficial effects, reference is made to the above, which will not be repeated herein.

Figure 16:
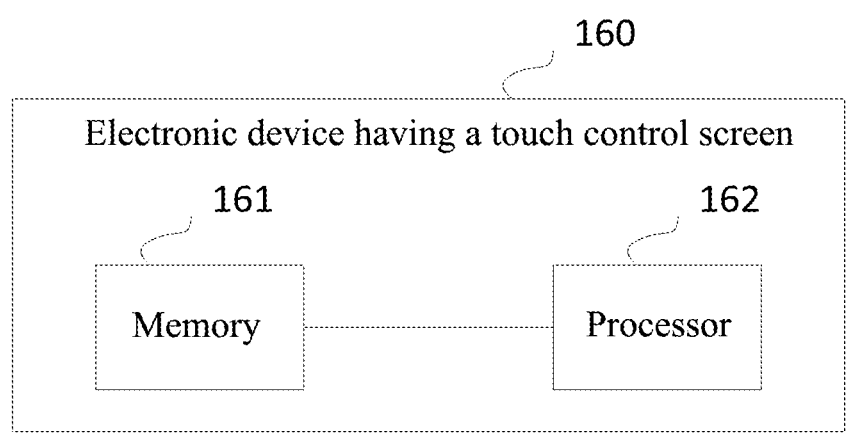
FIG. 16 is a schematic structural diagram of an electronic device having a touch control screen according to an embodiment of the present application.

The embodiments of the present application further provide an electronic device having a touch control screen. FIG. 16 is a schematic structural diagram of an electronic device having a touch control screen according to an embodiment of the present application. As illustrated in FIG. 16, an electronic device 160 having a touch control screen may include a memory 161 and a processor 162. The memory 161 is coupled to the processor 162.

The memory 161 is configured to store a program instruction.

The processor 162 is configured to invoke the program instruction stored in the memory, to cause the electronic device 160 having the touch control screen to perform any one of the methods for signal reception as described above.

The embodiments of the present application may further provide a computer readable storage medium having a computer program stored thereon, which when executed by the processor 162, implements the any one of the methods for signal reception as described above.

The electronic device having the touch control screen and the computer readable storage medium according to this embodiment of the present application may implement the method for signal reception performed by the electronic device according to any one of the above embodiments, for the specific implementation process and beneficial effects, reference is made to the above, which will not be repeated herein.

A person skilled in the art can understand that all or part of the steps of implementing the above method embodiments may be implemented by using hardware related to a program instruction. The foregoing program may be stored in a computer readable storage medium, and the steps of the above method embodiments are performed when the program is executed. The foregoing storage medium includes: a medium that can store program codes, such as a ROM, a RAM, a magnetic disk, or an optical disk.

Finally, it should be noted that the above embodiments are only for explaining, instead of limiting, the technical solutions of the present application. Although the present application has been described in detail with reference to the foregoing embodiments, those skilled in the art should understand that the technical solutions described in the foregoing embodiments may still be modified, or some or all of the technical features may be equivalently replaced, and the modifications or substitutions do not make the essence of the corresponding technical solutions deviate from the scope of the technical solutions of the embodiments of the present application.

What is claimed is:

1. A method for signal transmission, applied to an active stylus, wherein the method comprises:
   phase-encoding information to be transmitted using a preset phase signal, to obtain an encoded signal; and
   transmitting a stylus tip signal, wherein the stylus tip signal comprises the encoded signal;
   wherein before the transmitting a stylus tip signal, the method further comprises:
   obtaining the stylus tip signal, according to the encoded signal and a preset beacon code signal;
   wherein the beacon code signal is used to determine a touch control position of the active stylus on a touch control screen;
   wherein the obtaining the stylus tip signal, according to the encoded signal and a preset beacon code signal comprises:
   obtaining the stylus tip signal, according to the encoded signal, the preset beacon code signal and a null code signal;
   wherein the null code signal is used to determine a start time or an end time of the beacon code signal and then perform timing-synchronization on the stylus tip signal and the touch control screen;
   wherein the active stylus does not transmit any signal or generate any driving signal in the null code signal.

2. The method according to claim 1, wherein the beacon code signal comprises: a first beacon code signal and/or a second beacon code signal;
   wherein the first beacon code signal is located in front of the encoded signal in the stylus tip signal, and the second beacon code signal is located behind the encoded signal in the stylus tip signal.

3. The method according to claim 1, wherein the information to be transmitted comprises: information to be transmitted of the active stylus and a preset check code;
   wherein the check code is used to check a code of the information to be transmitted of the active stylus.

4. The method according to claim 3, wherein the information to be transmitted of the active stylus comprises: stylus tip pressure information of the active stylus and/or function key pressing information of the active stylus.

5. The method according to claim 1, wherein the transmitting a stylus tip signal comprises:
   transmitting the stylus tip signal at multiple driving frequencies.

6. A method for signal reception, applied to an electronic device having a touch control screen, wherein the method comprises:
   acquiring a stylus tip signal transmitted by an active stylus, wherein the stylus tip signal includes: an encoded signal; and
   phase decoding the encoded signal according to a preset phase signal, to obtain transmitted information;
   wherein the stylus tip signal further comprises: a preset beacon code signal;
   the method further comprises:
   determining a touch control position of the active stylus on the touch control screen, according to the beacon code signal;
   wherein the stylus tip signal further comprises: a null code signal;
   the method further comprises:
   determining a start time and an end time of the beacon code signal, according to the null code signal; and
   performing timing synchronization on the stylus tip signal and the touch control screen, according to the start time and the end time of the beacon code signal;
   wherein the active stylus does not transmit any signal or generate any driving signal in the null code signal.

7. The method according to claim 6, wherein the determining a touch control position of the active stylus on the touch control screen, according to the beacon code signal comprises:
   performing in-phase quadrature (IQ) demodulation of the beacon code signal, to obtain a first demodulated amplitude; and
   determining the touch control position of the active stylus on the touch control screen, according to the first demodulated amplitude.

8. The method according to claim 6, wherein the determining a start time and an end time of the beacon code signal, according to the null code signal comprises:

performing IQ demodulation on a signal within a preset code length time comprising the null code signal in the stylus tip signal, to obtain a second demodulated amplitude; and determining the start time and the end time of the beacon code signal, according to second demodulated amplitude.

9. The method according to claim 6, wherein the phase decoding the encoded signal according to a preset phase signal, to obtain transmitted information comprises:

splicing each of the encoded signal and the beacon code signal in the stylus tip signal, to obtain a spliced signal; and analyzing the spliced signal according to the preset phase signal, to determine a code of each of the encoded signal; and the transmitted information comprises: a code of at least one of the encoded signal in the stylus tip signal.

10. The method according to claim 6, wherein the beacon code signal comprises: a first beacon code signal and/or a second beacon code signal;

wherein the first beacon code signal is located in front of the encoded signal in the stylus tip signal, and the second beacon code signal is located behind the encoded signal in the stylus tip signal.

11. The method according to claim 6, wherein the transmitted information comprises: transmitted information of the active stylus and a preset check code;

the method further comprises:

checking the transmitted information of the active stylus, according to the check code.

12. The method according to claim 11, wherein the transmitted information of the active stylus comprises: stylus tip pressure information of the active stylus and/or function key pressing information of the active stylus.

13. The method according to claim 6, wherein the acquiring a stylus tip signal comprises:

acquiring the stylus tip signal at multiple driving frequencies.

14. An apparatus for signal transmission, comprising: a memory and a processor, wherein the memory is coupled to the processor, the memory is configured to store a program instruction, and the program instruction, when invoked by the processor, causes the processor to:

phase encode information to be transmitted using a preset phase signal, to obtain an encoded signal; and transmit a stylus tip signal, wherein the stylus tip signal comprises the encoded signal;

wherein the program instruction, when invoked by the processor, further causes the processor to:

obtain the stylus tip signal according to the encoded signal, a preset beacon code signal and a null code signal, wherein the beacon code signal is used to determine a touch control position of the active stylus on a touch control screen, and the null code signal is used to determine a start time or an end time of the beacon code signal and then perform timing synchronization on the stylus tip signal and the touch control screen;

wherein the active stylus does not transmit any signal or generate any driving signal in the null code signal.

15. The apparatus according to claim 14, wherein the beacon code signal comprises: a first beacon code signal and/or a second beacon code signal;

wherein the first beacon code signal is located in front of the encoded signal in the stylus tip signal, and the second beacon code signal is located behind the encoded signal in the stylus tip signal.

16. The apparatus according to claim 14, wherein the information to be transmitted comprises: information to be transmitted of the active stylus and a preset check code;

wherein the check code is used to check a code of the information to be transmitted of the active stylus.

17. The apparatus according to claim 14, wherein the program instruction causes the processor to:

transmit the stylus tip signal at multiple driving frequencies.

* * * * *